United States Patent [19]
Rossi et al.

[11] Patent Number: 5,581,455
[45] Date of Patent: Dec. 3, 1996

[54] CAPACITIVE CHARGE PUMP, BiCMOS CIRCUIT FOR LOW SUPPLY VOLTAGE AND METHOD THEREFOR

[75] Inventors: Domenico Rossi, Cilavegna, Italy; Hisashi Tahara, Narashino, Japan

[73] Assignee: SGS-Thomson Microelectronics, S.r.l., Agate Brianza, Italy

[21] Appl. No.: 454,645

[22] Filed: May 31, 1995

[30] Foreign Application Priority Data

May 31, 1994 [EP] European Pat. Off. .............. 94830272

[51] Int. Cl.⁶ .................................................. H02M 7/00
[52] U.S. Cl. .............................................. 363/60; 327/536
[58] Field of Search .............................. 363/59, 60, 61; 323/312; 327/535, 536, 537

[56] References Cited

U.S. PATENT DOCUMENTS

| | | | |
|---|---|---|---|
| 4,727,465 | 2/1988 | Cini et al. | 363/24 |
| 4,733,159 | 3/1988 | Edwards et al. | 323/282 |
| 5,111,375 | 5/1992 | Marshall | 363/60 |
| 5,179,296 | 1/1993 | Ito | 327/536 |
| 5,436,821 | 7/1995 | Inoue | 363/60 |
| 5,465,061 | 11/1995 | Dufour | 327/112 |
| 5,493,543 | 2/1996 | Kamens | 363/60 |

FOREIGN PATENT DOCUMENTS

| | | |
|---|---|---|
| 0427084 | 5/1991 | European Pat. Off. . |
| 59-218766 | 12/1984 | Japan . |
| 1060259 | 6/1989 | Japan . |

OTHER PUBLICATIONS

H. Webb, "Voltage Multiplication and Division Employing Active Switching" *Motorola Technical Developments*, vol. 12, p. 133 (1991).

*Primary Examiner*—Matthew V. Nguyen
*Attorney, Agent, or Firm*—Robert Groover; Betty Formby

[57] ABSTRACT

A BiCMOS capacitive charge pump circuit for low supply voltage has a bipolar part, functionally reproducing a basic charge pump circuit and a CMOS part that comprises MOS transistors functionally connected in parallel with the driving switch toward ground potential of the charge transfer capacitance and in parallel with the output diode for substantially nullifying voltage drops on the respective bipolar components. A special driving circuit (T8, R2, I2), powered at the boosted output voltage (VOUT) responds to the rise of the voltage on the output node above a minimum level, as ensured by the bipolar part of the charge pump circuit, to drive said MOS transistors (M1, M2), thus allowing the output voltage to reach a level that is substantially double the supply voltage (Vs), even when the latter is exceptionally low, for reliably ensuring switching of the CMOS part of the circuit.

57 Claims, 3 Drawing Sheets

5,581,455

CAPACITIVE CHARGE PUMP, BICMOS CIRCUIT FOR LOW SUPPLY VOLTAGE AND METHOD THEREFOR

CROSS-REFERENCE TO RELATED APPLICATION

This application claims priority from EP 94830272.4, filed May 31, 1994, which is hereby incorporated by reference. However, the content of the present application is not necessarily identical to that of the priority application.

BACKGROUND AND SUMMARY OF THE INVENTION

The invention relates to a capacitive charge pump circuit employing complementary bipolar transistors and complementary field effect transistors (BiCMOS) capable of ensuring a substantial multiplication of the supply voltage also when it is exceptionally low.

Capacitive charge pump circuits are widely used in electronic systems for generating voltages higher than the supply voltage. The capacitive charge pump circuit is basically a voltage boosting circuit that may be used either alone as a voltage doubler or as a stage or cell, to be connected in cascade to other similar cells, for realizing multi-stage voltage multipliers.

Basically, as shown in FIG. 1, a capacitive charge pump circuit is composed of a charge transfer (pumping) capacitor C1, connected to the intermediate node of a pair of diodes D1 and D2, connected in series between a supply (input) node and an output node, to which a storage capacitor C2 is connected. A pair of switches SW1 and SW2, driven in phase opposition to each other and at a certain frequency, switch the charge transfer capacitor alternatively to ground potential (charge phase) and to the supply node (charge transfer phase). If we neglect the voltage drop on the diodes D1 and D2, it may be seen that the circuit is theoretically capable of providing an output voltage $V_{OUT}$ which is twice the supply voltage $V_S$. (However, this ideal result is an approximation which assumes that: the voltage drop on the diodes D1 and D2 is negligible; the on-state voltage drop of the driving switches SW1 and SW2 is negligible; and the load current is negligible. In practice none of these assumptions is wholly accurate.)

More precisely, the maximum open circuit output voltage that can be obtained is given by:

$$V_{OUT}=2V_S-2V_{diode}-V_{SW1}-V_{SW2}.$$

With a relatively high supply voltage $V_S$, the above noted voltage drops may be reasonably neglected. Certainly this condition hardly exists in low voltage, battery powered systems. In portable apparatuses, as for example in electrical wrist watches, hearing aids, sensors and similar the electronic circuits, displays and actuators are often powered with small batteries at a nominal voltage that may often be comprised between 1.2V and 1.4V. With almost exhausted batteries, the supply voltage may even drop toward 1.0V.

In these conditions, it is evident that the above noted voltage drops on the circuit components that form a capacitive charge pump circuit assume great importance up to make critical the operation of the circuit itself.

If the circuit is realized with a "bipolar technology", that is by employing bipolar transistors as shown in FIG. 2, the switches may be implemented in the form of a complementary pair of bipolar transistors T1 and T2. In view of the fact that their offset voltage is typically of about 0.7V ($V_{BE}=0.7V$), they can ensure switching also with a supply voltage of about 1V.

On the other hand, the voltage drop on the diodes D1 and D2 and on the driving switches themselves (T1 and T2) do not allow, with a supply voltage in the order of 1–1.5V, a substantial duplication of the output voltage $V_{OUT}$ and the efficiency of the circuit drops drastically.

In order to obviate this typical limitation of a charge pump circuit made with bipolar components, it is known to realize the circuit with field effect devices, for example with MOS-FETs, that is by realizing the integrated circuit with a CMOS technology, as shown in FIG. 3.

The diodes D1 and D2 of the functional circuit of FIGS. 1 and 2 are substituted by MOS transistors M3 and M4 which virtually form a "synchronous rectifier", being the MOS transistor virtually free of offset.

By realizing the driving switches with a CMOS pair of transistors M1 and M2, the circuit is theoretically capable of producing an output voltage $V_{out}$ which is twice the supply voltage $V_S$.

This alternative solution, which is certainly advantageous in terms of "yield", has the drawback that with an exceptionally supply voltage, the circuit may cease to work by failing to switch. In fact, since the threshold value of the complementary pair of transistors M1 and M2 is strongly dependent on the temperature of operation, a supply voltage of at least 1.2–1.3V may be required for ensuring the switching of the driving switches M1 and M2.

In many apparatuses, it is important to ensure a correct operation even under precarious charge conditions of the battery (approaching exhaustion), that is with a supply voltage that may drop into the vicinity of about 1.1–1.0V and clearly, in these applications a CMOS circuit as the one depicted in FIG. 3, cannot be employed because it would make critical the operation of the circuit at exceptionally low supply voltages.

It is the main object of the invention to provide a capacitive charge pump circuit particularly suited for low supply voltage applications, capable of ensuring a correct operation even with a supply voltage or input voltage well below the limit of correct operability of a CMOS circuit, though being capable of producing a substantial doubling of the supply voltage even under such critical supply conditions.

This objective is fully met by the circuit of the invention that can be realized with a mixed fabrication technology (BiCMOS), and which employs bipolar transistors and field effect transistors.

Basically the circuit of the invention has a "bipolar portion" intrinsically capable of ensuring switching even with a supply (or input) voltage close to or equal to 1.0 Volt, and a CMOS portion, capable of practically nullifying (or at least markedly reducing) the voltage drops through the bipolar components of the circuit and therefore permitting a rise of the boosted output voltage close to a theoretically doubling of the supply (input) voltage.

In practice, the bipolar part of the circuit ensures operability of the circuit when it is first switched on, by producing a rise of the boosted output voltage, whenever the supply (or input) voltage is below the minimum value for a correct functioning of the CMOS part of the circuit. The substantial rise of the output voltage over the actual supply voltage that is eventually guaranteed by the bipolar part of the circuit, is sufficient to permit switching in the CMOS part of the circuit, which by intervening to essentially eliminate voltage drops, permits the circuit as a whole to reach a steady state working condition whereby it produces a substantial doubling of the supply (or input) voltage.

Essentially the bipolar part of the charge pump circuit of the invention is different from a typical charge pump bipolar circuit because the first diode (D1 of FIGS. 1 and 2) is replaced by a bipolar transistor driven by a bipolar stage controlled by the switching (clock) signal.

The CMOS part of the circuit of the invention essentially consists of a first field effect transistor connected in parallel and driven in phase with the bipolar transistor that constitutes the switch toward ground of the charge transfer capacitor and by a second field effect transistor, functionally connected in parallel with the charge diode of the output capacitor, driven in phase with the charge transfer from the charge transfer capacitor to the output storing capacitor.

The CMOS pair of transistors is driven by the switching (clock) signal through a level shifting bipolar stage followed by an inverting stage, both powered with the voltage present on the output node of the charge pump circuit. The second inverting stage may be realized by a CMOS inverter, though it may also be realized by a second bipolar stage.

As soon as the voltage present on the output node of the circuit reaches and becomes higher than the minimum voltage for overcoming the turn-on threshold of the MOS transistor or of the MOS transistors that form the second inverting stage, or, in case that also the second inverting stage is bipolar, the turn-on threshold of the CMOS pair of transistors, functionally connected in parallel with the respective bipolar elements, these CMOS transistors begin to switch, practically eliminating the relative voltage drops.

The operation of the circuit under critical conditions of the input voltage, for example when switching on the circuit and/or in presence of a battery close to exhaustion, is ensured by the bipolar part of the capacitive charge pump circuit, which is capable of rising the voltage on the output mode above the supply or input voltage by an amount sufficient to drive the CMOS part of the circuit which thereafter ensure a substantial duplication of the supply voltage (or of the input voltage in case of a multi-stage voltage multiplier). In case of a multi-stage voltage multiplier circuit, the basic BiCMOS circuit (cell or module) of the invention may be effectively employed as a first stage. The other stages of the voltage multiplier may be realized entirely with a CMOS technology (for example as shown in FIG. 3).

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 4:
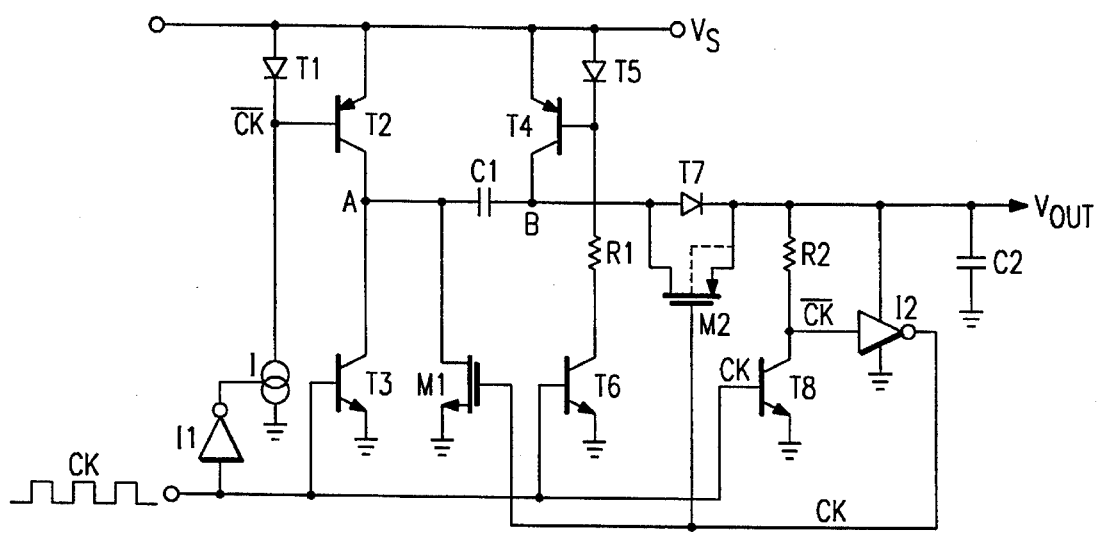
FIG. 4 shows a capacitive charge pump circuit made according to the present invention by employing bipolar and field effect components.

The numerous innovative teachings of the present application will be described with particular reference to the presently preferred embodiment (by way of example, and not of limitation), in which:

With reference to FIG. 4, the basic capacitive charge pump circuit may be identified in functional terms, by the pair of driving switches formed by the complementary pair of bipolar transistors T2 (npn) and T3 (pnp), by the charge transfer capacitor C1 by the diode D3, by the charge storing output capacitor C2 and by the circuit that functionally substitutes the first diode (D1 in FIGS. 1 and 2) and which in the depicted example is composed of the transistor T4 driven by the switching signal CK through an inverting stage formed by the transistor T6, by the limiting resistance R1 and by the diode D5.

Phase opposition driving of the complementary pair T2 and T3 may be implemented, according to a common practice, through an inverter I1, the currein generator I and the diode D1. Of course, in this case the inverter I1 must also be realized by a bipolar stage, because it must be capable of switching even at exceptionally low supply voltage.

Under conditions of low supply voltage $V_S$ and in presence of a low output voltage $V_{OUT}$, for example when switching-on the circuit or following an abnormal heavy absorption by the circuitry powered at the boosted output voltage $V_{OUT}$ produced by the circuit, the output voltage $V_{OUT}$ may be lower than the minimum voltage sufficient to bring to a state of conduction the field effect transistor or transistors which compose the stage I2, which is powered with the output voltage $V_{OUT}$ or, if the stage I2 is (less preferably) realized with bipolar transistors, the MOS pair M1 and M2.

In these conditions, the MOS transistors M1 and M2 remain in an OFF state. When the driving signal CK which controls the operation of the charge pump circuit is high, T3, T6 and T4 are ON, therefore the capacitance C1 charges to a voltage given by:

$$V_{C1}=V_S-V_{CEsat(T3)}-V_{CEsat(T4)}.$$

Figure 1:
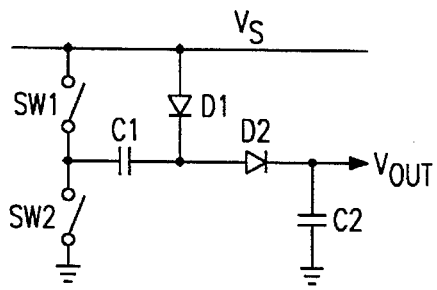
FIG. 1 is a basic diagram of a capacitive charge pump circuit, as already discussed above.
Figure 2:
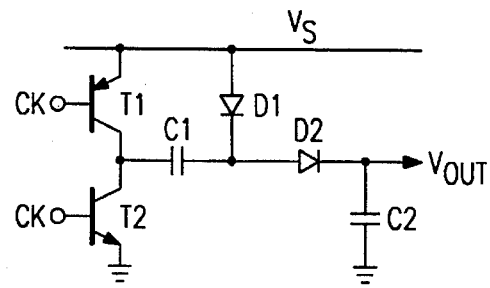
FIG. 2 shows a capacitive charge pump circuit made with bipolar components, according to a known technique, as already discussed above.

Basically, the transistor T4 substitutes the function of the diode D1 of the circuits of FIGS. 1 and 2.

When the driving signal CK goes low, the node A assumes a voltage given by:

$$V_A=V_S-V_{CEsat(T2)}$$

while the node B, which is not charged by any current in view of the fact that T6 is off, reaches the voltage given by:

$$\begin{aligned}V_B &= V_S-V_{CEsat(T2)}+V_S-V_{CEsat(T3)}-V_{CEsat(T4)}\\ &= 2V_S-2V_{CEsat(pnpT2\ and\ T4)}-V_{CEsat(npnT3)}.\end{aligned}$$

Therefore, through the diode T7, the output capacitance C2 will tend to charge up to a voltage that in a steady state (open circuit) condition is given by:

$$V_{OUT}=V_B-V_{diodeT7}=2V_S-2V_{CEsat(pnp)}-V_{CEsat(npn)}-V_{diode}.$$

Conversely, in conditions of operation with a low supply voltage but in presence of an output voltage $V_{OUT}$ sufficient to permit the turning-on of the field effect transistor or transistors, the CMOS pair of transistors M1 and M2 will be driven in phase with the driving signal CK.

The turning-on of the MOS transistor M1 in phase with the transistor T3, forces the node A to ground potential, practically nullifying the voltage drop ($V_{CEsat(T3)}$) on the bipolar transistor T3, while the turning-on of the MOS transistor M2 in phase with the charge transfer from the capacitor C1 to the capacitor C2, substantially nullifies the voltage drop on the diode T3.

In these precarious supply voltage conditions, through a combined action of the bipolar and CMOS devices, it is possible to obtain an output voltage that, in a steady state and open circuit conditions, reaches the value given by:

$$V_{OUT}=2_{VS}-2_{VCEsat(pnp)}.$$

Figure 3:
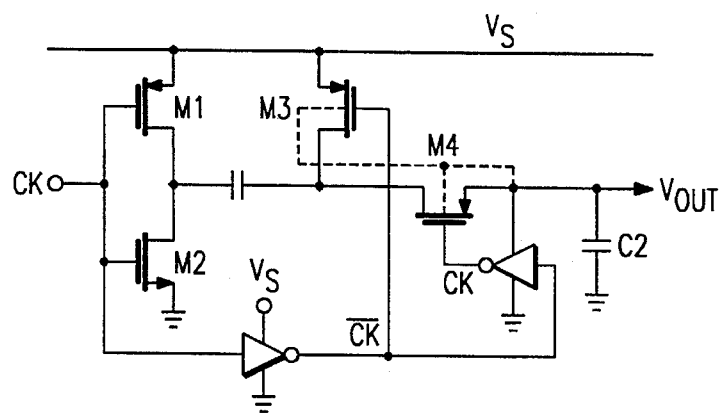
FIG. 3 shows a capacitive charge pump circuit made with field effect transistors (CMOS) as already described above.

By considering that the voltage $V_{CEsat}$ of lateral pnp transistors is notably low, that is below about 100 mV, the circuit is capable of achieving a substantial doubling of the supply voltage even when the latter is exceptionally low, and in practice would not allow a CMOS capacitive charge pump circuit of the known type, as depicted in FIG. 3, to function.

By assuming a practical embodiment characterized by the following parameters:

$V_{CEsat(pnp)}$=50 mV
$V_{CEsat(npn)}$=200 mV
$V_{BE}$=0.7V and a supply voltage $V_S$=1.2V, the circuit of the invention, that is the bipolar part thereof, permits to reach an output voltage given by:

$$V_{OUT}=2.4-0.3-0.7=1.4V$$

Upon activation, with the rise of the output voltage $V_{OUT}$ toward 1.4V, of the CMOS part of the circuit, the output voltage reaches a steady state (open circuit) value given by:

$$V_{OUT}=2.4-0.1=2.3V$$

In practice, the circuit permits to obtain an output voltage that is substantially double the supply voltage even when the latter is too low for ensuring functioning of a CMOS circuit.

The capacitive charge pump circuit of the invention may be employed as a voltage doubler and also as the first stage or input stage of a voltage multiplier composed by a plurality of voltage boosting stages in cascade.

Figure 5:
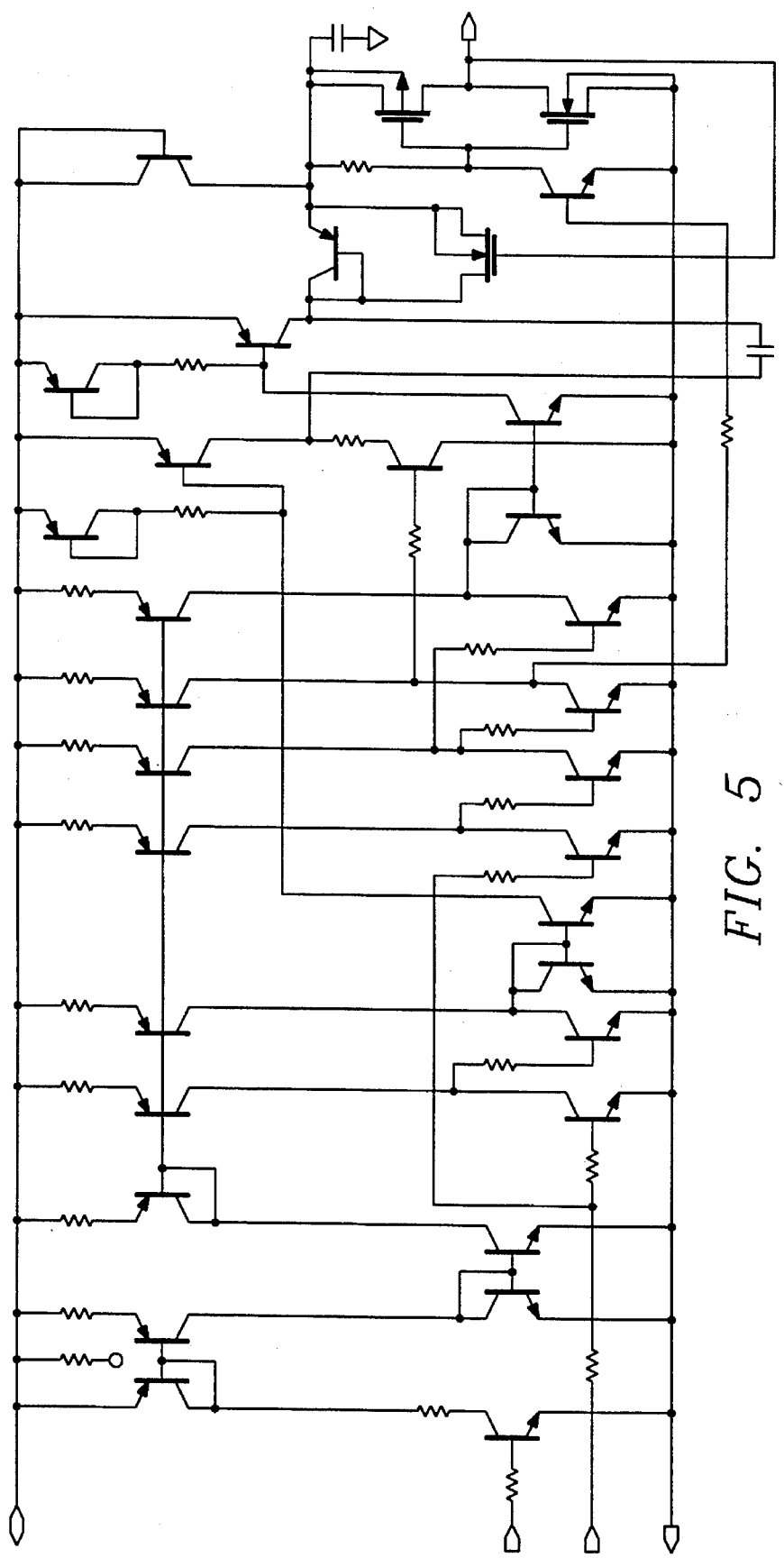
FIG. 5 shows an example of a multistage capacitive charge pump circuit which embodies the principles of FIG. 4.

FIG. 5 shows an example of a multistage capacitive charge pump circuit which embodies the principles of FIG. 4. Such multistage drivers are particularly advantageous when relatively high voltages are needed, such as in the electroluminescent display driver of FIG. 6.

Figure 6:
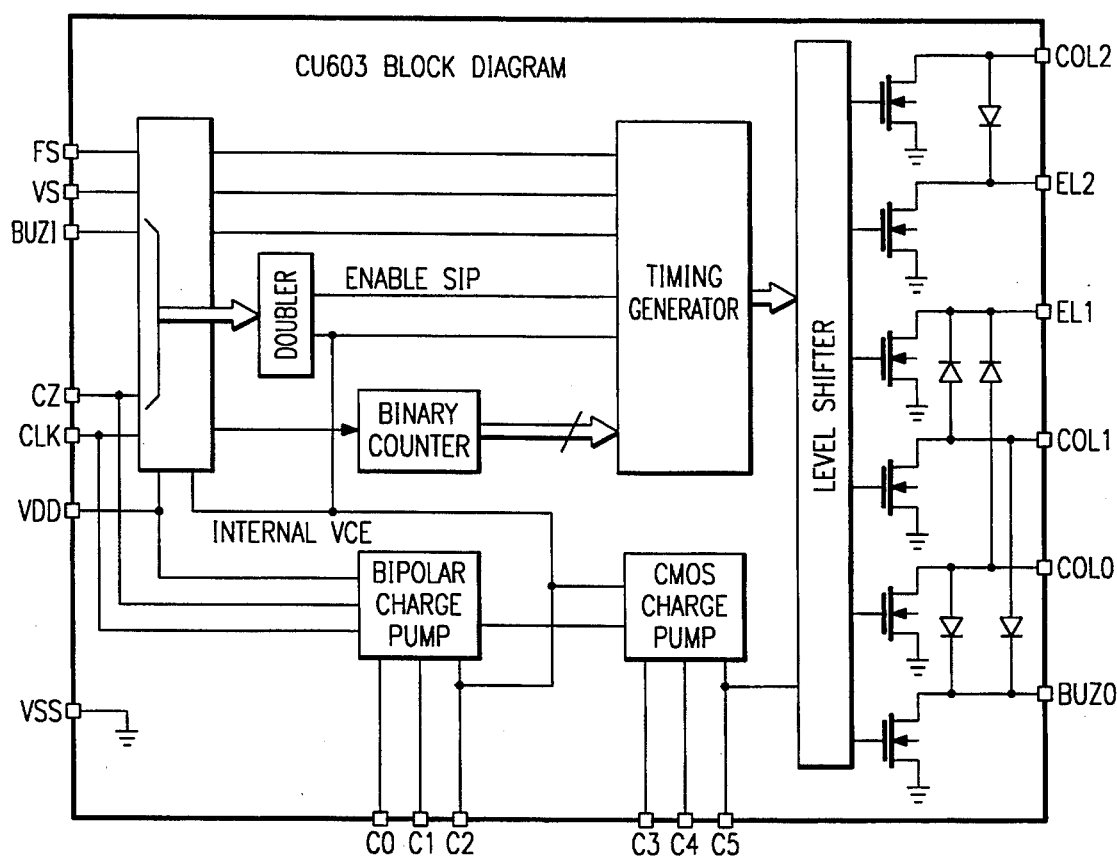
FIG. 6 shows an example of an integrated circuit in which a charge pump like that of FIG. 5 is advantageously used.

FIG. 6 shows an example of an integrated circuit in which a charge pump like that of FIG. 5 is advantageously used. This particular chip is an electroluminescent display driver which can operate from 1.5V or 3V battery supply, and provide a display drive output of up to 120V (using single coil or double coil modes of operation), and also provide a buzzer driver output. This is preferably implemented in BCD (bipolar/CMOS/DMOS) technology. In this chip the block labelled "CMOS charge pump" is configured according to FIG. 5. The Interface logic provides control signals to a timing generator, which drives a level shifter. The level shifter is driven by the pumped voltage from the CMOS charge pump, to provide the desired high voltage levels at its outputs.

Figure 7:
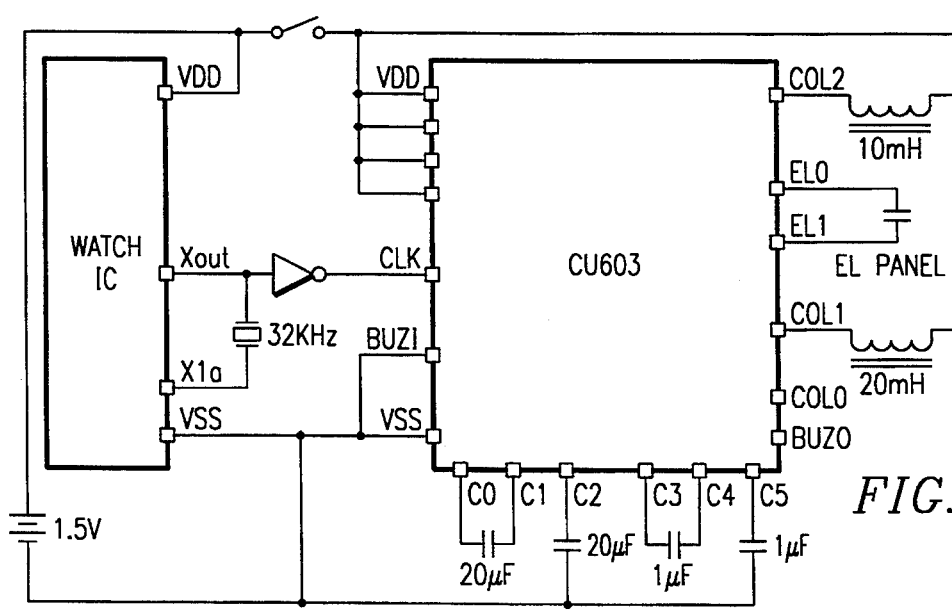
FIG. 7 shows a system which includes an integrated circuit like that of FIG. 5 in combination with a customized integrated circuit (a watch chip in this example).

FIG. 7 shows a system which includes an integrated circuit CU603 like that of FIG. 5 in combination with a customized integrated circuit (a watch chip in this example). The illustrated configuration provides operation in double coil mode, from a 1.5V battery supply.

According to a disclosed class of innovative embodiments, there is provided: A voltage-boosting circuit, comprising: first and second bipolar transistors of opposite conductivity types, connected to pull a first node alternately toward a first power supply voltage and toward a second power supply voltage, in dependence on the timing of a clock signal; a pumping capacitor connected between said first node and a second node; a first rectifying element connected to pass current asymmetrically between said first power supply voltage and said second node; a second rectifying element connected to pass current asymmetrically between said second node and an output node; said first and second rectifying elements being connected in a relation such that said output node is driven thereby toward an output voltage which is not intermediate between said first and second power supply voltages; a level shifting circuit, connected to provide a boosted clock signal which is referenced to said output voltage; and a field effect transistor, connected in parallel with one of said first and second bipolar transistors, and connected to be driven be said boosted clock signal.

According to another disclosed class of innovative embodiments, there is provided: A voltage-boosting circuit, comprising: first and second bipolar transistors of opposite conductivity types, connected to pull a first node alternately toward a first power supply voltage and toward a second power supply voltage, in dependence on the timing of a clock signal; said first power supply voltage being more positive than said second power supply voltage; a pumping capacitor connected between said first node and a second node; a first rectifying element connected to intermittently pull said second node toward said first power supply voltage; a second rectifying element connected to intermittently source current from said second node to an output node, to thereby drive said output node toward an output voltage which is more positive than said first power supply voltage; a level shifting circuit, connected to provide a logic signal which is synchronized to said clock signal and referenced to said output voltage and to one of said power supply voltages; and a field effect transistor, connected in parallel with one of said first and second bipolar transistors, and connected to be driven be said logic signal provided by said level shifting circuit.

According to another disclosed class of innovative embodiments, there is provided: A voltage-boosting circuit, comprising: first and second bipolar transistors, which are pnp and npn respectively, and are connected to pull a first node alternately toward first and second power supply voltages, in dependence on the timing of a clock signal; a pumping capacitor connected between said first node and a second node; a first rectifying element connected to intermittently pass current asymmetrically between said first power supply voltage and said second node, with a timing which is dependent on said clock signal; a diode which is connected to pass current asymmetrically between said second node and an output node; said first and second rectifying elements being connected in a relation such that said output node is driven thereby toward an output voltage which is not intermediate between said first and second power supply voltages; a level shifting circuit, connected to provide a boosted clock signal which is referenced to said output voltage; a first field effect transistor, connected in parallel with one of said bipolar transistors, and connected to be driven be said logic signal provided by said level shifting circuit; and a second first field effect transistor, connected in parallel with said diode, and connected to be driven be said boosted clock signal.

According to another disclosed class of innovative embodiments, there is provided: A capacitive charge pump circuit for low supply voltage functionally composed of a charge transfer capacitor, connected to an intermediate node of a pair of diodes connected in series between a supply node and an output node, to which a storage output capacitor is connected, and a pair of bipolar transistors as switches, driven in phase opposition, of said charge transfer capacitor, comprising a first field effect transistor connected in parallel and driven in phase with the bipolar transistor of said pair which conducts during a charge phase of said charge transfer capacitance, functionally capable of nullifying the saturation voltage of said bipolar transistor; a second field effect transistor connected in parallel with the charge diode of said storage output capacitor and driven in phase with the charge transfer from said charge transfer capacitor to said storage capacitor, functionally capable of nullifying the voltage drop on said diode; and means responsive to the rise of the voltage of said output node above a minimum boosted level, capable of driving said field effect transistors and to allow a substantial duplication of the supply voltage.

According to another disclosed class of innovative embodiments, there is provided: An integrated circuit method for providing a boosted supply voltage, comprising the steps of: driving a first node alternately toward a first power supply voltage and toward a second power supply voltage, in dependence on the timing of a clock signal, using bipolar transistors; passing current asymmetrically between said first power supply voltage and a second node which is connected to said first node by a pumping capacitor; passing current asymmetrically between said second node and an output node with a polarity such that said output node is driven thereby toward an output voltage which is not intermediate between said first and second power supply voltages; using a level shifting circuit, connected to provide a boosted logic signal which is synchronized to said clock signal and referenced to said output voltage; and shunting one of said bipolar transistors with a field effect transistor which is connected to be driven be said boosted clock signal.

According to another disclosed class of innovative embodiments, there is provided: An integrated circuit method for providing a boosted supply voltage, comprising the steps of: driving a first node alternately toward a first power supply voltage and toward a second power supply voltage, in dependence on the timing of a clock signal, using bipolar transistors; passing current, through a bipolar transistor which is driven in synchrony with said clock signal, between said first power supply voltage and a second node which is connected to said first node by a pumping capacitor; providing a diode between said second node and an output node with a polarity such that said output node is driven thereby toward an output voltage which is not intermediate between said first and second power supply voltages; using a level shifting circuit, connected to provide a boosted logic signal which is synchronized to said clock signal and referenced to said output voltage; and shunting one of said bipolar transistors with a first field effect transistor which is connected to be driven be said boosted clock signal; and shunting said diode with a second field effect transistor which is connected to be driven be said boosted clock signal.

According to another disclosed class of innovative embodiments, there is provided: An integrated circuit, comprising: control logic connected to implement a desired functionality; interface circuitry operatively connected to provide external interfacing for said control logic, and to provide at least one output which is level-shifted to reference a pumped voltage provided by voltage-boosting circuitry; wherein said voltage-boosting circuitry comprises: first and second bipolar transistors of opposite conductivity types, connected to pull a first node alternately toward a first power supply voltage and toward a second power supply voltage, in dependence on the timing of a clock signal; a pumping capacitor connected between said first node and a second node; a first rectifying element connected to pass current asymmetrically between said first power supply voltage and said second node; a second rectifying element connected to pass current asymmetrically between said second node and an output node; said first and second rectifying elements being connected in a relation such that said output node is driven thereby toward an output voltage which is not intermediate between said first and second power supply voltages; a clock boosting circuit, connected to provide a boosted clock signal which is referenced to said output voltage; and a field effect transistor, connected in parallel with one of said first and second bipolar transistors, and connected to be driven be said boosted clock signal.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

For another example, a dual implementation can use PMOS rather than NMOS shunt devices.

For another example, the mirror ratio between T1 and T2 is relatively unimportant, and does not have to be 1:1 as in the presently preferred embodiment.

For another example, the innovative principles can also be adapted to a circuit which uses additional clock phases.

What is claimed is:

1. A voltage-boosting circuit, comprising:

first and second bipolar transistors of opposite conductivity types, connected to pull a first node alternately toward a first power supply voltage and toward a second power supply voltage, in dependence on the timing of a clock signal;

a pumping capacitor connected between said first node and a second node;

a first rectifying element connected to pass current asymmetrically between said first power supply voltage and said second node;

a second rectifying element connected to pass current asymmetrically between said second node and an output node; said first and second rectifying elements being connected in a relation such that said output node is driven thereby toward an output voltage which is not intermediate between said first and second power supply voltages;

a level shifting circuit, connected to provide a boosted clock signal which is referenced to said output voltage; and a field effect transistor, connected in parallel with one of said first and second bipolar transistors, and connected to be driven be said boosted clock signal.

2. The circuit of claim 1, further comprising an output capacitor connected between said output node and said second power supply.

3. The circuit of claim 1, further comprising an output capacitor, which is larger than said pumping capacitor, connected between said output node and said second power supply.

4. The circuit of claim 1, wherein said first power supply voltage is more positive than said second power supply voltage, and said output node is driven to be more positive than said first power supply voltage.

5. The circuit of claim 1, wherein said field effect transistor is NMOS.

6. The circuit of claim 1, wherein said first rectifying element comprises a third bipolar transistor which is of the same conductivity type as said first bipolar transistor and is connected to pass current between said first power supply voltage and said second node in dependence on the timing of said clock signal.

7. The circuit of claim 1, wherein said first rectifying element comprises a third bipolar transistor which is of the same conductivity type as said second bipolar transistor and is connected to pass current between said first power supply voltage and said second node in dependence on the timing of said clock signal; and wherein said first and third bipolar transistors are both driven by respective current mirrors, and said field effect transistor is connected to pass current in parallel with said second bipolar transistor.

8. The circuit of claim 1, wherein said second rectifying element comprises a diode and a second field effect transistor which is gated in common with said first field effect transistor and is connected to shunt said diode.

9. The circuit of claim 1, wherein said second power supply voltage is chip ground.

10. A voltage-boosting circuit, comprising:
    first and second bipolar transistors of opposite conductivity types, connected to pull a first node alternately toward a first power supply voltage and toward a second power supply voltage, in dependence on the timing of a clock signal; said first power supply voltage being more positive than said second power supply voltage;
    a pumping capacitor connected between said first node and a second node;
    a first rectifying element connected to intermittently pull said second node toward said first power supply voltage;
    a second rectifying element connected to intermittently source current from said second node to an output node, to thereby drive said output node toward an output voltage which is more positive than said first power supply voltage;
    a level shifting circuit, connected to provide a logic signal which is synchronized to said clock signal and referenced to said output voltage and to one of said power supply voltages; and
    a field effect transistor, connected in parallel with one of said first and second bipolar transistors, and connected to be driven be said logic signal provided by said level shifting circuit.

11. The circuit of claim 10, further comprising an output capacitor connected between said output node and said second power supply.

12. The circuit of claim 10, further comprising an output capacitor, which is larger than said pumping capacitor, connected between said output node and said second power supply.

13. The circuit of claim 10, wherein said field effect transistor is NMOS.

14. The circuit of claim 10, wherein said first rectifying element comprises a third bipolar transistor which is of the same conductivity type as said first bipolar transistor and is connected to pass current between said first power supply voltage and said second node in dependence on the timing of said clock signal.

15. The circuit of claim 10, wherein said first rectifying element comprises a third bipolar transistor which is of the same conductivity type as said second bipolar transistor and is connected to pass current between said first power supply voltage and said second node in dependence on the timing of said clock signal; and wherein said first and third bipolar transistors are both driven by respective current mirrors, and said field effect transistor is connected to pass current in parallel with said second bipolar transistor.

16. The circuit of claim 10, wherein said second power supply voltage is chip ground.

17. The circuit of claim 10, wherein said second rectifying element comprises a diode and a second field effect transistor which is gated in common with said first field effect transistor and is connected to shunt said diode.

18. A voltage-boosting circuit, comprising:
    first and second bipolar transistors, which are pnp and npn respectively, and are connected to pull a first node alternately toward first and second power supply voltages, in dependence on the timing of a clock signal;
    a pumping capacitor connected between said first node and a second node;
    a first rectifying element connected to intermittently pass current asymmetrically between said first power supply voltage and said second node, with a timing which is dependent on said clock signal;
    a diode which is connected to pass current asymmetrically between said second node and an output node; said first and second rectifying elements being connected in a relation such that said output node is driven thereby toward an output voltage which is not intermediate between said first and second power supply voltages;
    a level shifting circuit, connected to provide a boosted clock signal which is referenced to said output voltage;
    a first field effect transistor, connected in parallel with one of said bipolar transistors, and connected to be driven be said logic signal provided by said level shifting circuit; and
    a second first field effect transistor, connected in parallel with said diode, and connected to be driven be said boosted clock signal.

19. The circuit of claim 18, further comprising an output capacitor connected between said output node and said second power supply.

20. The circuit of claim 18, further comprising an output capacitor, which is larger than said pumping capacitor, connected between said output node and said second power supply.

21. The circuit of claim 18, wherein said first power supply voltage is more positive than said second power supply voltage, and said output node is driven to be more positive than said first power supply voltage.

22. The circuit of claim 18, wherein said second power supply voltage is chip ground.

23. The circuit of claim 18, wherein said first field effect transistor is NMOS.

24. The circuit of claim 18, wherein said first field effect transistor is NMOS, and said second first field effect transistor is PMOS.

25. The circuit of claim 18, wherein said first rectifying element comprises a third bipolar transistor which is of the same conductivity type as said first bipolar transistor and is connected to pass current between said first power supply voltage and said second node in dependence on the timing of said clock signal.

26. The circuit of claim 18, wherein said first rectifying element comprises a third bipolar transistor which is connected to pass current between said first power supply voltage and said second node in dependence on the timing of said clock signal; and wherein said first and third bipolar transistors are both driven by respective current mirrors, and said field effect transistor is connected to pass current in parallel with said second bipolar transistor.

27. A capacitive charge pump circuit for low supply voltage functionally composed of a charge transfer capacitor, connected to an intermediate node of a pair of diodes connected in series between a supply node and an output node, to which a storage output capacitor is connected, and a pair of bipolar transistors as switches, driven in phase opposition, of said charge transfer capacitor, comprising a first field effect transistor connected in parallel and driven in phase with the bipolar transistor of said pair which conducts during a charge phase of said charge transfer capacitance, functionally capable of nullifying the saturation voltage of said bipolar transistor;

a second field effect transistor connected in parallel with the charge diode of said storage output capacitor and driven in phase with the charge transfer from said charge transfer capacitor to said storage capacitor, functionally capable of nullifying the voltage drop on said diode; and means responsive to the rise of the voltage of said output node above a minimum boosted level, capable of driving said field effect transistors and to allow a substantial duplication of the supply voltage.

28. The circuit of claim 27, wherein said means are constituted by a first, level- shifting stage composed of a bipolar transistor driven by a clock signal of the charge pump circuit and by at least a second inverting stage powered at the voltage present on said output node.

29. The circuit of claim 27, wherein said second inverting stage is a CMOS inverter.

30. The circuit of claim 27, wherein said first diode of said pair of diodes is substituted by a bipolar transistor having a first current terminal connected to the supply node, a second current terminal connected to said intermediate node and a base connected to a node of a driving circuit comprising a forward biased diode connected between the supply node and the base of the transistor, a limiting resistance and a fourth bipolar transistor driven by said clock signal, functionally connected between said limiting resistance and a common ground node of the circuit.

31. The circuit of claim 27, wherein the transistors of said pair of bipolar transistors are complementary, lateral transistors.

32. A voltage multiplier composed of a plurality of capacitive charge pump circuits in cascade, characterized by the fact that at least the charge pump circuit constituting the first or input stage of said plurality of circuits, is a circuit as defined in claim 27.

33. A voltage multiplier composed of a plurality of capacitive charge pump circuits in cascade, characterized by the fact that at least the charge pump circuit constituting the first or input stage of said plurality of circuits, is a circuit as defined in claim 28.

34. A voltage multiplier composed of a plurality of capacitive charge pump circuits in cascade, characterized by the fact that at least the charge pump circuit constituting the first or input stage of said plurality of circuits, is a circuit as defined in claim 29.

35. A voltage multiplier composed of a plurality of capacitive charge pump circuits in cascade, characterized by the fact that at least the charge pump circuit constituting the first or input stage of said plurality of circuits, is a circuit as defined in claim 30.

36. A voltage multiplier composed of a plurality of capacitive charge pump circuits in cascade, characterized by the fact that at least the charge pump circuit constituting the first or input stage of said plurality of circuits, is a circuit as defined in claim 31.

37. An integrated circuit, comprising:

control logic connected to implement a desired functionality;

interface circuitry operatively connected to provide external interfacing for said control logic, and to provide at least one output which is level-shifted to reference a pumped voltage provided by voltage-boosting circuitry;

wherein said voltage-boosting circuitry comprises:

first and second bipolar transistors of opposite conductivity types, connected to pull a first node alternately toward a first power supply voltage and toward a second power supply voltage, in dependence on the timing of a clock signal;

a pumping capacitor connected between said first node and a second node;

a first rectifying element connected to pass current asymmetrically between said first power supply voltage and said second node;

a second rectifying element connected to pass current asymmetrically between said second node and an output node; said first and second rectifying elements being connected in a relation such that said output node is driven thereby toward an output voltage which is not intermediate between said first and second power supply voltages;

a clock boosting circuit, connected to provide a boosted clock signal which is referenced to said output voltage; and a field effect transistor, connected in parallel with one of said first and second bipolar transistors, and connected to be driven be said boosted clock signal.

38. The integrated circuit of claim 37, further comprising an output capacitor connected between said output node and said second power supply.

39. The integrated circuit of claim 37, further comprising an output capacitor, which is larger than said pumping capacitor, connected between said output node and said second power supply.

40. The integrated circuit of claim 37, wherein said first power supply voltage is more positive than said second power supply voltage, and said output node is driven to be more positive than said first power supply voltage.

41. The integrated circuit of claim 37, wherein said field effect transistor is NMOS.

42. The integrated circuit of claim 37, wherein said first rectifying element comprises a third bipolar transistor which is of the same conductivity type as said first bipolar transistor and is connected to pass current between said first power supply voltage and said second node in dependence on the timing of said clock signal.

43. The integrated circuit of claim 37, wherein said first rectifying element comprises a third bipolar transistor which is of the same conductivity type as said second bipolar transistor and is connected to pass current between said first power supply voltage and said second node in dependence on the timing of said clock signal; and wherein said first and third bipolar transistors are both driven by respective current mirrors, and said field effect transistor is connected to pass current in parallel with said second bipolar transistor.

44. The integrated circuit of claim 37, wherein said second rectifying element comprises a diode and a second field effect transistor which is gated in common with said first field effect transistor and is connected to shunt said diode.

45. The integrated circuit of claim 37, wherein said second power supply voltage is chip ground.

46. An integrated circuit method for providing a boosted supply voltage, comprising the steps of:
   (a.) driving a first node alternately toward a first power supply voltage and toward a second power supply voltage, in dependence on the timing of a clock signal, using bipolar transistors;
   (b.) passing current asymmetrically between said first power supply voltage and a second node which is connected to said first node by a pumping capacitor;
   (c.) passing current asymmetrically between said second node and an output node with a polarity such that said output node is driven thereby toward an output voltage which is not intermediate between said first and second power supply voltages;
   (d.) using a level shifting circuit, connected to provide a boosted logic signal which is synchronized to said clock signal and referenced to said output voltage; and
   (e.) shunting one of said bipolar transistors with a field effect transistor which is connected to be driven be said boosted clock signal.

47. The method of claim 46, further comprising the additional step of smoothing the voltage of said output node using an output capacitor connected between said output node and said second power supply.

48. The method of Claim 46, wherein said first power supply voltage is more positive than said second power supply voltage, and said output node is driven to be more positive than said first power supply voltage.

49. The method of claim 46, wherein said field effect transistor is NMOS.

50. The method of claim 46, wherein said second rectifying element comprises a diode and a second field effect transistor which is gated in common with said first field effect transistor and is connected to shunt said diode.

51. The method of claim 46, wherein said second power supply voltage is chip ground.

52. An integrated circuit method for providing a boosted supply voltage, comprising the steps of:
   (a.) driving a first node alternately toward a first power supply voltage and toward a second power supply voltage, in dependence on the timing of a clock signal, using bipolar transistors;
   (b.) passing current, through a bipolar transistor which is driven in synchrony with said clock signal, between said first power supply voltage and a second node which is connected to said first node by a pumping capacitor;
   (c.) providing a diode between said second node and an output node with a polarity such that said output node is driven thereby toward an output voltage which is not intermediate between said first and second power supply voltages;
   (d.) using a level shifting circuit, connected to provide a boosted logic signal which is synchronized to said clock signal and referenced to said output voltage; and
   (e.) shunting one of said bipolar transistors with a first field effect transistor which is connected to be driven be said boosted clock signal; and
   (f.) shunting said diode with a second field effect transistor which is connected to be driven be said boosted clock signal.

53. The method of claim 52, further comprising the additional step of smoothing the voltage of said output node using an output capacitor connected between said output node and said second power supply.

54. The method of claim 52, wherein said first power supply voltage is more positive than said second power supply voltage, and said output node is driven to be more positive than said first power supply voltage.

55. The method of claim 52, wherein said field effect transistor is NMOS.

56. The method of claim 52, wherein said second rectifying element comprises a diode and a second field effect transistor which is gated in common with said first field effect transistor and is connected to shunt said diode.

57. The method of claim 52, wherein said second power supply voltage is chip ground.

* * * * *